(12) United States Patent
Yukawa et al.

(10) Patent No.: US 6,532,817 B1
(45) Date of Patent: Mar. 18, 2003

(54) ANGULAR VELOCITY SENSOR AND PROCESS FOR MANUFACTURING THE SAME

(75) Inventors: Junichi Yukawa, Ikoma (JP); Jiro Terada, Hirakata (JP); Kuniharu Nakamaru, Tachikawa (JP); Minoru Ishihara, Kawagoe (JP); Kozo Ono, Hachioji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/300,009

(22) Filed: Apr. 27, 1999

(30) Foreign Application Priority Data

May 6, 1998 (JP) .......................................... 10-123216

(51) Int. Cl.$^7$ ................................................ G01P 9/04
(52) U.S. Cl. ..................... 73/504.16; 310/329; 310/370
(58) Field of Search ........................ 73/504.16, 504.15, 73/504.14, 504.12, 504.04; 310/329, 370

(56) References Cited

U.S. PATENT DOCUMENTS

| | | | |
|---|---|---|---|
| 2,368,052 A | 1/1945 | Unger | |
| 2,479,562 A | 8/1949 | Ferrill, Jr. | |
| 2,544,646 A | 3/1951 | Barnaby et al. | |
| 2,683,247 A | 7/1954 | Wiley | |
| 2,683,596 A | 7/1954 | Morrow et al. | |
| 2,756,353 A | 7/1956 | Samsel | |
| 2,974,530 A | 3/1961 | Jaouen | |
| 3,071,007 A | 1/1963 | Bjorn et al. | |
| 3,113,223 A | 12/1963 | Smith et al. | |
| 3,116,466 A | 12/1963 | Grib | |
| 3,127,775 A | 4/1964 | Hansen et al. | |
| 3,128,397 A | 4/1964 | Shinada et al. | |
| 3,141,100 A | 7/1964 | Hart | |
| 3,143,889 A | 8/1964 | Simmons et al. | |
| 3,206,986 A | 9/1965 | Christensen | |
| 3,238,789 A | 3/1966 | Erdley | |
| 3,258,617 A | 6/1966 | Hart | |
| 3,269,192 A | 8/1966 | Southworth, Jr. et al. | |
| 3,307,409 A | 3/1967 | Newton, Jr. | |
| 3,319,472 A | 5/1967 | Reefman | |
| 3,371,234 A | 2/1968 | Cady | |
| 3,391,547 A | 7/1968 | Kingston | |

(List continued on next page.)

FOREIGN PATENT DOCUMENTS

| | | | |
|---|---|---|---|
| EP | 0 685 704 A1 | 12/1995 | |
| EP | 0 791 804 A1 | 8/1997 | |
| GB | 1304496 | 1/1973 | |
| GB | 1455046 | 11/1976 | |
| GB | 15402709 | 2/1979 | |
| GB | 2061502 A | 5/1981 | |
| GB | 2111209 A | 6/1983 | |
| JP | 58-51204 | 11/1983 | |
| JP | 61-294311 A | 12/1986 | |
| JP | 63-42417 | * 2/1988 | ............... 73/504.16 |
| JP | 07-260490 A | 10/1995 | |
| JP | 09-021643 A | 1/1997 | |
| JP | 09-072744 A | 3/1997 | |
| JP | 09-166444 A | 6/1997 | |
| JP | 10-111132 A | 4/1998 | |
| JP | 10-221087 A | 8/1998 | |
| JP | 11-201758 A | 7/1999 | |
| JP | 11-218589 A | 8/1999 | |

*Primary Examiner*—Helen Kwok
(74) *Attorney, Agent, or Firm*—Amster, Rothstein & Ebenstein

(57) ABSTRACT

An integral bimorph angular rate sensor is formed by directly bonding two tuning fork members in the thickness direction to enhance the detecting sensitivity of the angular velocity sensor. The individual tuning fork members are formed from a single crystalline piezoelectric material such as quartz and are bonded in the crystal axis direction as to establish a piezoelectric phenomenon wherein the piezoelectric materials of the bonded tuning fork members have inverse polarities in their width or thickness directions.

6 Claims, 18 Drawing Sheets

U.S. PATENT DOCUMENTS

| | | |
|---|---|---|
| 3,465,597 A | 9/1969 | Riordan et al. |
| 3,479,536 A | 11/1969 | Norris |
| 3,517,288 A | 6/1970 | Bennett et al. |
| 3,520,195 A | 7/1970 | Tehon |
| 3,654,443 A | 4/1972 | Dendy et al. |
| 3,656,354 A | 4/1972 | Lynch |
| 3,678,762 A | 7/1972 | Denis |
| 3,680,391 A | 8/1972 | Denis |
| 3,683,213 A | 8/1972 | Staudte |
| 3,697,766 A | 10/1972 | Ganter et al. |
| 3,739,202 A | 6/1973 | Cady |
| 3,805,097 A | 4/1974 | Yanchich et al. |
| 3,805,509 A | 4/1974 | Assmus et al. |
| 3,839,915 A | 10/1974 | Schlitt |
| 3,842,681 A | 10/1974 | Mumme |
| 3,924,474 A | 12/1975 | Friedland et al. |
| 3,944,862 A | 3/1976 | Shimoi et al. |
| 3,961,318 A | 6/1976 | Farrand et al. |
| 4,019,391 A | 4/1977 | Ljung |
| 4,212,443 A | 7/1980 | Duncan et al. |
| 4,215,570 A | 8/1980 | Eer Nisse |
| 4,263,546 A | 4/1981 | Morris |
| 4,317,059 A | 2/1982 | Besson |
| 4,320,320 A | 3/1982 | Momosaki et al. |
| 4,341,974 A | 7/1982 | Calderara |
| 4,344,010 A | 8/1982 | Vig et al. |
| 4,365,182 A | 12/1982 | Ballato et al. |
| 4,421,621 A | 12/1983 | Fujii et al. |
| 4,429,248 A | 1/1984 | Chuang |
| 4,454,443 A | 6/1984 | Lukaszek et al. |
| 4,469,979 A | 9/1984 | Chuang |
| 4,479,098 A | 10/1984 | Watson |
| 4,538,461 A | 9/1985 | Juptner et al. |
| 4,562,375 A | 12/1985 | Besson et al. |
| 4,654,663 A | 3/1987 | Alsenz et al. |
| RE32,931 E | 5/1989 | Staudte |
| 4,899,587 A | 2/1990 | Staudte |
| 5,251,483 A | 10/1993 | Soderkvist |
| 5,329,816 A | 7/1994 | Soderkvist et al. |
| 5,408,876 A * | 4/1995 | Macy ...................... 73/504.16 |
| 5,420,548 A * | 5/1995 | Nakajima ................ 73/504.16 |
| 5,444,639 A * | 8/1995 | White ..................... 73/504.16 |
| 5,635,786 A * | 6/1997 | Fujimoto et al. ........ 73/504.12 |
| 5,691,595 A | 11/1997 | Tomikawa et al. |
| 5,747,691 A * | 5/1998 | Yoshino et al. .......... 73/504.16 |
| 5,794,080 A * | 8/1998 | Watanabe et al. ........ 73/504.12 |
| 5,854,427 A * | 12/1998 | Terada et al. ............ 73/504.16 |
| 5,929,555 A * | 7/1999 | Sugimoto et al. ........... 310/360 |
| 6,098,460 A * | 8/2000 | Otsuchi et al. .......... 73/514.34 |
| 6,140,748 A * | 10/2000 | Yang ......................... 310/370 |

* cited by examiner

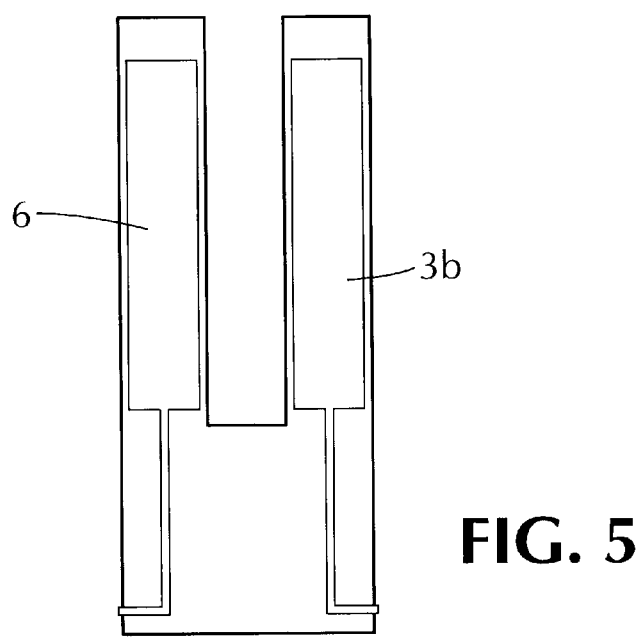
FIG. 5
FIG. 6A
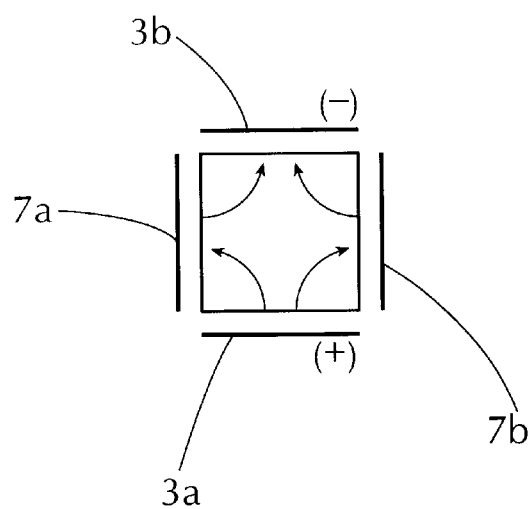
FIG. 6B
Direction of Oscillations
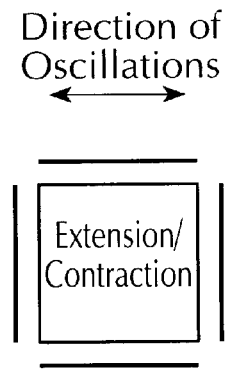

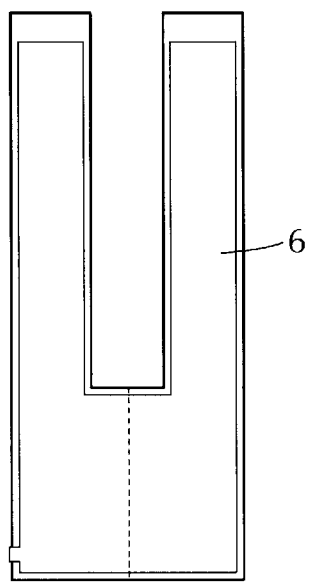
FIG. 25
FIG. 26A
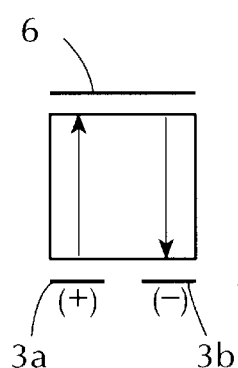
FIG. 26B
Direction of
Oscillations
⟷
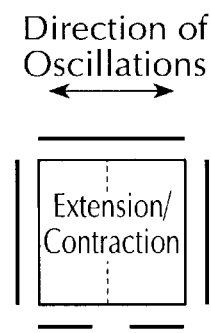
FIG. 27A
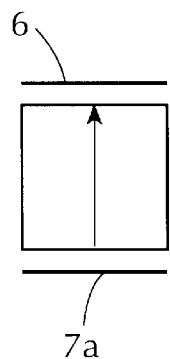
FIG. 27B
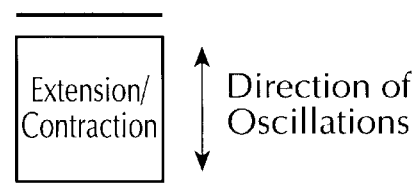

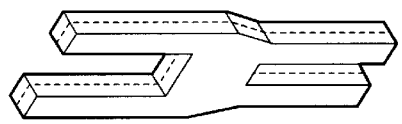
FIG. 29C
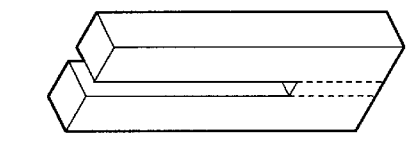
FIG. 29G
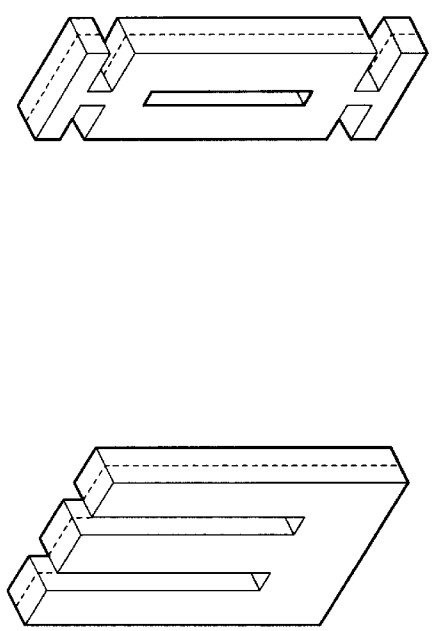
FIG. 29A
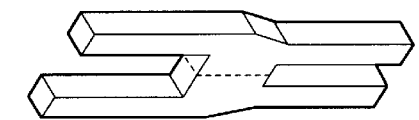
FIG. 29B
FIG. 29E
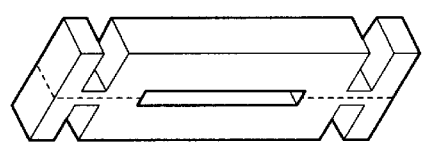
FIG. 29F
FIG. 29D

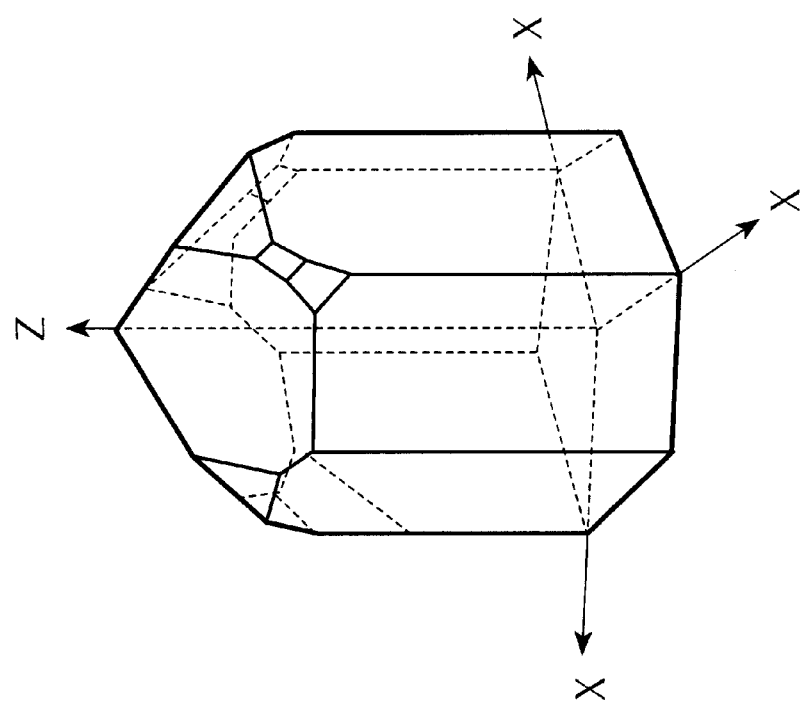
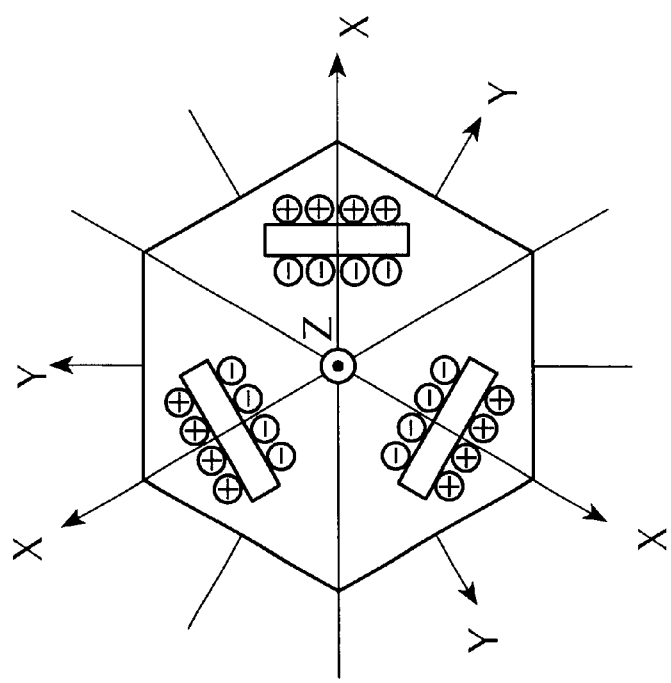
FIG. 30A
FIG. 30B

ANGULAR VELOCITY SENSOR AND PROCESS FOR MANUFACTURING THE SAME

BACKGROUND OF THE INVENTION

1. Field of the Invention

The present invention relates to an angular velocity sensor to be used, for example, in a car navigation system, a control system for an automobile, or a manual blur correcting system for still or video cameras, and to a process or method for manufacturing the angular velocity sensor.

2. Prior Art

A principal angular velocity sensor known in the prior art is the expensive and large top-type gyroscope which is most often used in airplanes or ships. In recent years, however, there has been developed an inexpensive oscillatory type angular velocity sensor, the application of which has been expanded to automotive control systems, car navigation systems as well as to manual blur correcting systems for video or still cameras. As a result of these expanded and new uses, the demand for smaller and less expensive angular velocity sensors has greatly increased.

Accordingly, there has been proposed in recent years an angular velocity sensor employing a single crystalline piezoelectric element made of quartz or lithium tantalate, making it possible to provide a smaller and less expensive angular velocity sensor.

In the prior art angular velocity sensor utilizing a single crystalline piezoelectric element, a pair of arms are joined and fixed at their individual end portions by a root member to form a tuning fork oscillator. This tuning fork oscillator is, for example, cut from a quartz sheet into an integral structure. A set of drive electrodes are affixed to one of the arms of the tuning fork oscillator for driving the tuning fork oscillator piezoelectrically in the direction of a principal plane at a resonant frequency. The drive electrodes are electrically driven by an external oscillator circuit. A monitor and a ground electrode are affixed to the other arm for detecting the oscillation amplitude caused by the oscillator circuit. Sense electrodes are also affixed to the same arm as the monitor electrode for piezoelectrically detecting the stress due to the Coriolis force acting on the tuning fork.

In the prior art sensor, the electric charge generated at the monitor electrode is amplified by an external circuit and then compared with a reference signal preset by an AGC (auto gain control), to control the oscillator circuit which maintains the oscillation amplitude of the tuning fork oscillator constant. On the other hand, the sense electrodes detect a signal due to the Coriolis force, which is amplified by an external amplifier circuit synchronously with the signal detected by the monitor electrode. The modulated detected signal is thereafter demodulated and the undesired frequency band is filtered out by an LPF (low pass filter).

Angular velocity sensors of this type have not been effective for a number of reasons. For example, quartz is typically a single crystalline piezoelectric material composed of arrayed single crystals of $SiO_2$. Since SI has a positive polarity and $O_2$ has a negative polarity, electric neutralization is established by arraying SI and $O_2$ symmetrically. However, if a strain is applied, to the $SiO_2$ piezoelectric material the electric symmetry is broken and electric charges are generated.

FIG. 30A is a diagram representing the individual axes of a quartz crystal. As shown, an axis joining the edges is defined as an X-axis (or electric axis) and an axis normal to the plane made by the X—X axes is defined as a Z-axis (or optical axis). FIG. 30B represents a section in the X-Y plane having the polarities shown. As described above, a single crystalline piezoelectric material, such as quartz, exhibits specific piezoelectric characteristics and has specific polarities with respect to the crystal axes which depend on the molecular array of the crystalline piezoelectric material.

On the other hand, an oscillation type angular velocity sensor detects rotation of an object by detecting the Coriolis force acting at a right angle with respect to the direction of the oscillations. Thus, the angular velocity sensor is required to have piezoelectric characteristics for two axes and to have means for applying the oscillations and means for detecting the force or oscillations at a right angle to the applied oscillations. Generally, a tuning fork oscillator is cut from a piezoelectric material in the direction as shown in FIG. 31. Although it is easy to apply the driving oscillations in a tuning fork oscillator which has been cut in the direction shown in FIG. 31, the sensitivity of the detected Coriolis force (the perpendicular oscillations) is very low.

Thus an object of the invention is to provide an angular velocity sensor which has an enhanced detection sensitivity via the sense electrodes.

In accordance with another object of the invention, there is provided an angular velocity sensor which has a simple electrode construction which can be formed by, for example, a photolithographic method.

SUMMARY OF THE INVENTION

In order to solve the above-specified problems, according to the invention, there is provided an angular velocity sensor which comprises a bimorph structure including a first tuning fork member including at least two arms formed from a single crystalline piezoelectric material and at least one root member joining the arms, and a second tuning fork member having a shape generally similar to that of the first tuning fork member and also formed from a single crystalline piezoelectric material. The first tuning fork member and the second tuning fork member are directly bonded in the thickness direction into an integral bimorph tuning fork oscillator structure with the crystal axes directions of the piezoelectric materials of the two tuning fork members having inverse polarities with respect to each other in the width direction.

More specifically, the first tuning fork member and the second tuning fork member have reversed polarities in the electrically active X-direction. Therefore, it is necessary to provide only a single set of sense electrodes formed on opposed peripheral faces of one of the arms of the tuning fork oscillator. If an electric field is applied in the X-axis direction, the field direction, and the polarized piezoelectric material directions are aligned on one turning fork member surface of one arm but are reversed on the second turning fork member surface, the extending/contracting forces in the opposite directions act in opposition to the oscillations, which act in parallel with the plane normal to the X-axis direction. In contrast, in the prior art devices, a charge component due to the Coriolis force is canceled in the vicinity of the center of the section of the arm. By inverting the polarity of the piezoelectric material, as described, the direction of the charges caused by the Coriolis force, in the section of the arm,-greatly enhance the efficiency of the angular velocity sensor. Thus, a factor which weakens or decreases the electric field intensity in the prior art angular velocity sensors is reduced thereby enhancing the detection sensitivity of the angular velocity sensor of the invention. By this arrangement, the bimorph structure of the present invention has a Coriolis force detection sensitivity which is twice as high as the prior art sensors. Thus, because the axial direction in which the Coriolis force is to be detected is also the axial direction in which the piezoelectric characteristics are high, the resulting angular velocity sensor has a high sensitivity and an excellent total S/N ratio.

Still further, in the angular velocity sensor of this invention, the drive electrodes for causing oscillation in parallel with the principal plane of the tuning fork oscillator are preferably formed on the four outer peripheral faces of one of the two arms of the tuning fork and the sense electrodes for detecting the electric charge generated by oscillations normal to the principal face of the tuning fork oscillator are preferably formed on the opposed side faces of the other arm of the tuning fork, thereby, simplifying the electrode construction compared with the prior art sensors.

According to still another aspect of the invention, there is provided an angular velocity sensor comprising a tuning fork oscillator including first and second arms made of a single crystalline piezoelectric material, and at least one root member joining the first and second arms. The first and second arms are bonded such that the polarities of the crystal axes of the first and second arms are perpendicular to each other in the thickness direction of the tuning fork oscillator. Since the polarities of the piezoelectric material are perpendicular in the two arms of the bimorph tuning fork of the present invention, the charge components due to the Coriolis force, as detected from the two arms, are in phase with each other but in opposite phase with respect to the acceleration component. This makes it easy to connect the sense electrodes with the common electrode so that the amplification stages of the amplifier can be simplified. Another advantage of this construction is that the phase shift of the two independent amplifiers of the prior art and the problem of the drift of the intermediate voltage due to the temperature characteristics can be avoided.

As a still further advantage of the invention, with the polarities of the piezoelectric materials differing between the two arms (or at the center of), the tuning fork, one arm is preferably used for driving the tuning fork and for monitoring the drive operation and the other arm is used for the sensing the Coriolis force and monitoring the sensing operation or for only sensing the Coriolis force. As a result, it is possible to efficiently process the two orthogonal oscillations piezoelectrically, i.e., the drive of the tuning fork oscillator and the detection of the stress due to the Coriolis force.

According to a further aspect of the invention, there is provided an angular velocity sensor comprising two tuning fork members made of piezoelectric sheets of crystals which exhibit a piezoelectric phenomena and inverted piezoelectric phenomena and have a plus polarity at one end of the electrically active X-axis thereof and a minus polarity at the other end, and including a pair of arms extended from the tuning fork root members to set the X-axis direction in the width or thickness direction, in which the two tuning fork members are directly bonded with the polarities of the X-axis direction being inverted from each other.

In a further aspect of the invention, the angular velocity sensors as described, may have sense electrodes which are not divided but are formed as a single structure so that the extending/contracting forces in the opposite directions are applied to the individual arms of the tuning fork oscillator which are inverted in polarity so that the detection sensitivity can be enhanced.

According to a still further aspect of the invention, there is provided a process for manufacturing an angular velocity sensor wherein the tuning fork members are formed by photolithography from a sheet material which is prepared by bonding at least two sheets of single crystalline piezoelectric material directly in different crystal axes directions. As a result, the oscillator can be manufactured extremely inexpensively and can be mass produced.

According to yet a further aspect of the invention, there is provided a process for manufacturing an angular velocity sensor wherein the tuning fork members are formed by photolithography from at least two wafers of single crystal piezoelectric materials which are directly bonded on the wafers in different azimuths of the crystal axes. By bonding the tuning fork members which are etched prior to bonding, even a thick tuning fork oscillator can be manufactured by the photolithographic method so that the aforementioned technique can be utilized even for applications where high precision and high S/N ratio are required.

BRIEF DESCRIPTION OF THE DRAWINGS

These and other objects, features and advantages of the invention, its construction and operation will be best understood from the following detailed description, taken in conjunction with the accompanying drawings, of which:

FIG. 5 is a rear elevation view of the tuning fork oscillator of FIG. 1;

FIG. 6A is a schematic view showing the flow of electric charge during the drive mode of the tuning fork oscillator thereof;

FIG. 6B is a schematic view showing the strain and direction of oscillation during the drive mode of the tuning fork oscillator thereof;

FIG. 25 is a rear elevation view of the tuning fork oscillator of FIG. 22;

FIG. 26A is a schematic view showing the flow of electric charges during the drive mode of the tuning fork oscillator thereof;

FIG. 26B is a schematic view showing the strain and direction of oscillation during the drive mode of the tuning fork oscillator thereof;

FIG. 27A is a schematic view showing the flow of electric charge during the detection mode of the tuning fork oscillator thereof;

FIG. 27B is a schematic view showing the strain and direction of oscillation during the detection mode of the tuning fork oscillator thereof;

FIG. 29A–29G show alternate embodiments for a tuning fork oscillator in accordance with the invention as disclosed;

FIG. 30A is a diagram used for explaining the individual axes of quartz;

FIG. 30B is a diagram showing a section through the X-Y plane of the quartz.

DESCRIPTION OF THE PREFERRED EMBODIMENTS

Figure 1:
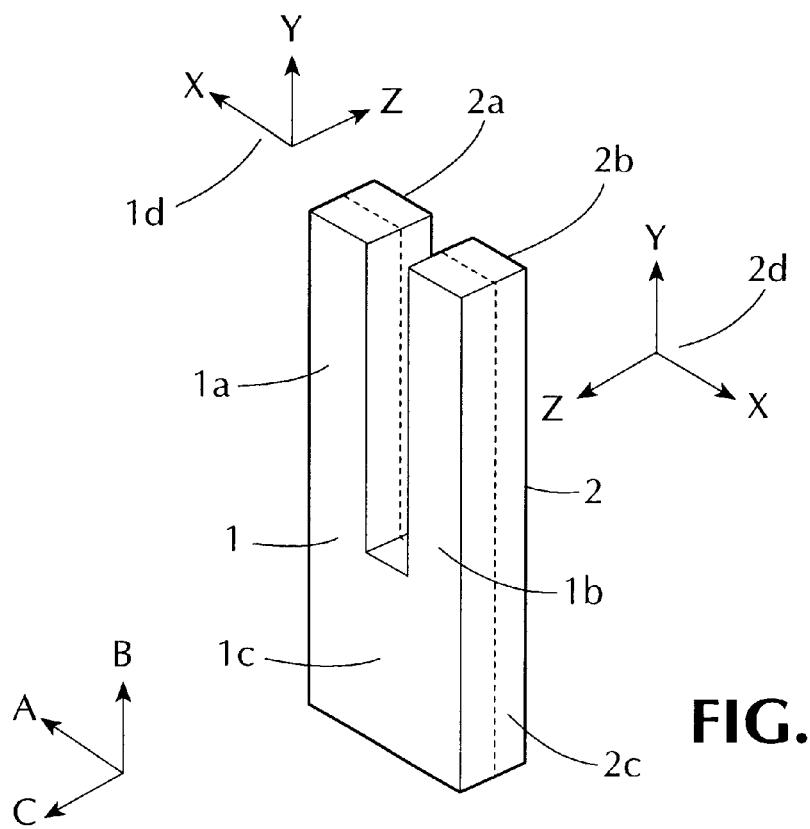
FIG. 1 is a diagram of a tuning fork oscillator of an angular velocity sensor in accordance with a first embodiment of the invention.
Figure 2:
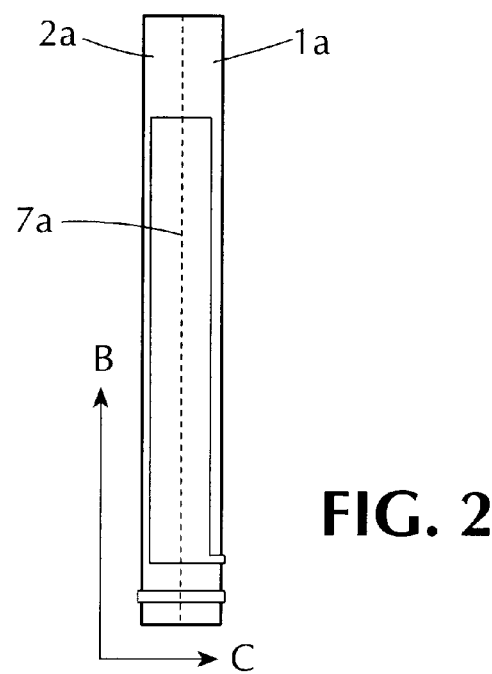
FIG. 2 is a left side elevation view of the tuning fork oscillator of FIG. 1 showing the electrodes.

FIG. 1 shows a structure of an angular velocity sensor using a tuning fork oscillator in accordance with a first embodiment of the invention. Reference numerals 1a and 1b designate arms which are joined at a root member 1b disposed between arms 1a and 1c to form a first tuning fork member as generally shown at 1. Likewise, reference numerals 2b and 2a designate arms which are also joined at a root member 2c to form a second tuning fork member as generally shown at 2. The tuning fork members 1 and 2 are each made of a single crystalline piezoelectric material, such as quartz, and are directly bonded to each other to construct a bimorph structure. This direct bonding establishes a bonded state similar to that of an integral structure by sufficiently smoothing the surfaces of the members to be bonded by adsorbing hydroxide radicals after a hydrophilic treatment and by superposing and thermally treating the members so that the hydroxide radicals and hydrogen may be released from the interface to bond the members as is well-known in the art.

As further shown in FIG. 1, the tuning fork member 1 has crystal axes directions, as designated by 1d, and the tuning fork member 2 which is bonded to tuning fork member 1 in the thickness direction C, and has crystal axes directions, as designated by 2d, such that the X-axis of the tuning fork member 2 is inverted, in the width direction A, with respect to the X-axis of the tuning fork member 1. In other words, the tuning fork members 1 and 2 are so bonded in the thickness direction C that the X-axis directions are inverted from each other in the width direction A, or in this case the directions of their principal planes.

Figure 3:
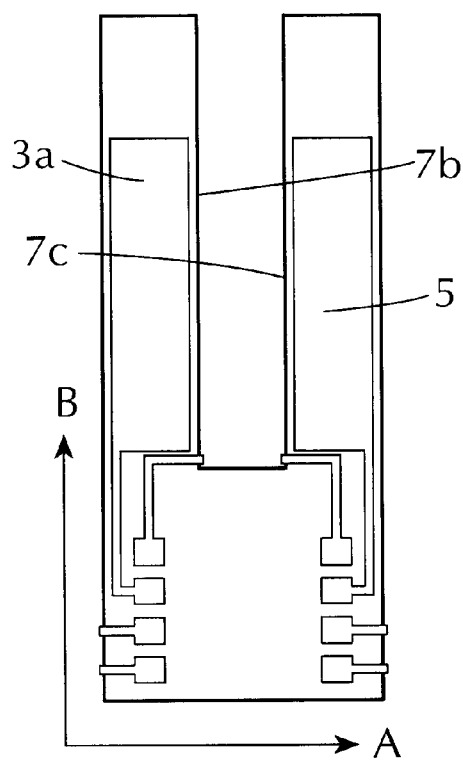
FIG. 3 is a front elevation view of the tuning fork oscillator of FIG. 1.
Figure 4:
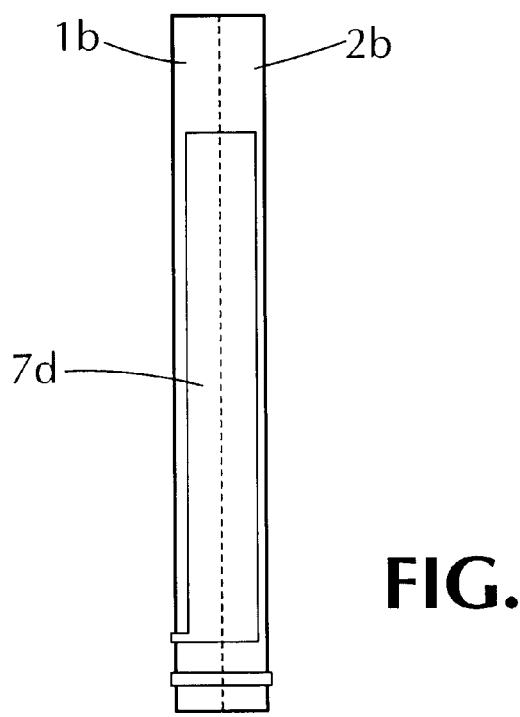
FIG. 4 is a right side elevation view of the tuning fork oscillator of FIG. 1.

The tuning fork oscillator for the angular velocity sensor thus constructed will now be specifically described with reference to FIGS. 2 to 7. As shown in FIGS. 3, 5 and 6A, drive electrodes 3a and 3b are mounted on the A-B plane sides (i.e., front and rear sides) of arms 1a and 2a for piezoelectrically driving the tuning fork oscillator at a resonant frequency in the A-B plane. The drive electrodes are electrically driven by an external oscillator circuit described below. As further shown (see FIG. 7A), on the A-B plane sides of arms 1b and 2b, there are mounted a monitor electrode 5 and a ground electrode 6 for detecting the amplitude of the oscillations which are generated by the oscillator circuit of the tuning fork oscillator. On the B-C plane sides of the arms 1a, 1b, 2a and 2b (see FIGS. 2, 3,4, 6A and 7A), on the other hand, there are mounted sense electrodes 7a, 7b, 7c and 7d for piezoelectrically detecting the Coriolis force which is generated corresponding to the angular velocity on the B-axis of the tuning fork oscillators. In this embodiment, the sense electrodes 7a and 7b are effectively ground electrodes and also function as drive electrodes.

Figure 8:
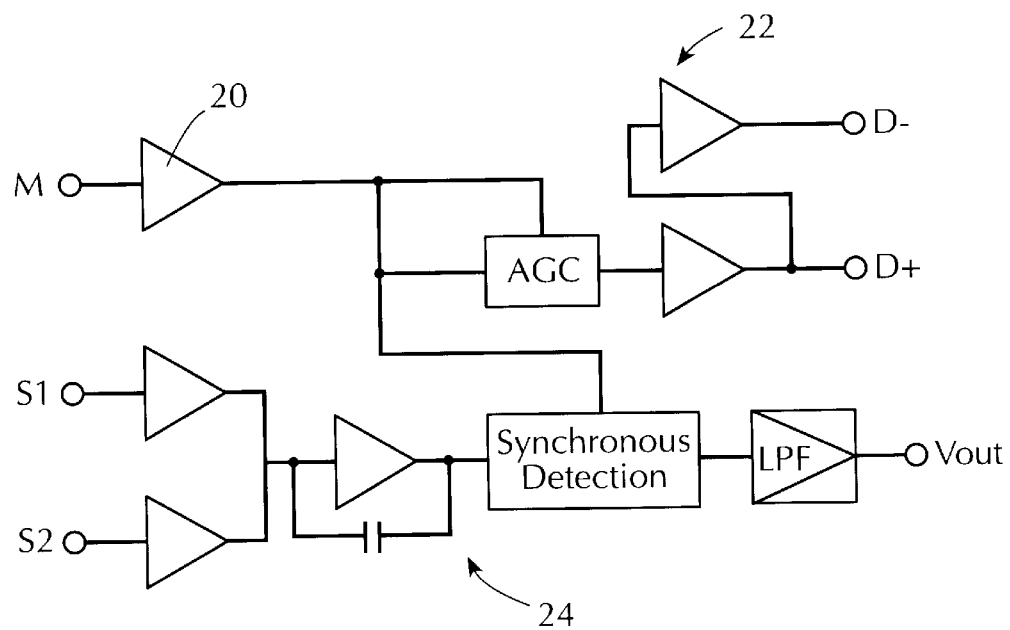
FIG. 8 is a circuit block diagram for the angular velocity sensor of the invention.

In the present embodiment, the electric charge generated at the monitor electrode 5, is applied to the M input of the external circuit, shown in FIG. 8, amplified by amplifier 20 and are then compared with a reference signal preset by an AGC (auto gain control) by comparator 22, to control the oscillator circuit to control the drive signals D− and D+ to cause the oscillation amplitude of the tuning fork oscillator to be constant. On the other hand, the sense electrodes 7a to 7d detect a signal due to the Coriolis force, which are applied to sense inputs S1 and S2 of the external circuit, FIG. 8, synchronously with the signal from monitor electrode 5. The modulated signal, is demodulated in demodulator 24. Thereafter, the unnecessary band is filtered out by a LPF (low pass filter to produce the sensor output, Vout.

Figure 7A:
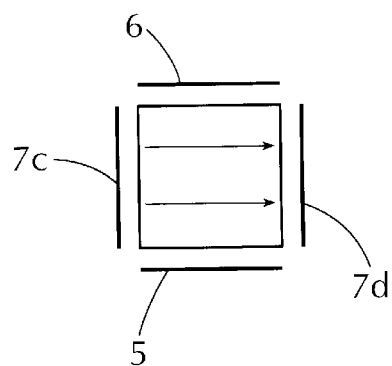
FIG. 7A is a schematic view showing the flow of electric charge during the detection mode of the tuning fork oscillator thereof.
Figure 7B:
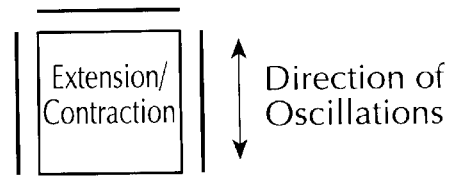
FIG. 7B is a schematic view showing the strain and direction of oscillation during the detection mode of the tuning fork oscillator thereof.

FIGS. 6A and 6B show the strain created in a section of arm 1a and the flow of electric charge in the drive mode (of the A-B plane oscillations). During driving, drive signals are applied to the drive electrodes 3a and 3b, causing each arm to extend/contract in the width direction resulting in a charge flow, as shown. Since the X-axis is reversed in the arms 1a and 2a, a stress is created such that the strain is reversed in the width direction of the arms, as shown in. FIG. 6B. In this way, arms 1a and 1b can be oscillated in the A-B plane. The monitor electrode 5 piezoelectrically detects the electric charge caused by the oscillation of the turning fork oscillator. Referring to FIGS. 7A and 7B, the strain in a section of the arm 1b and the charge flow in the detection mode (or in the B-C plane) of the Coriolis force are shown. The Coriolis force is an oscillation in the direction of the B-C plane, (FIG. 2) so that the arm extends/contracts in the thickness directions, as shown in FIG. 7B. The resultant electric charge is in the same direction because the arms of the tuning fork member 1 and the tuning fork member 2 have reversed X-axes, as shown in FIG. 7A, so that it can be efficiently detected by the sense electrodes 7a, 7b, 7c and 7d.

Figure 9:
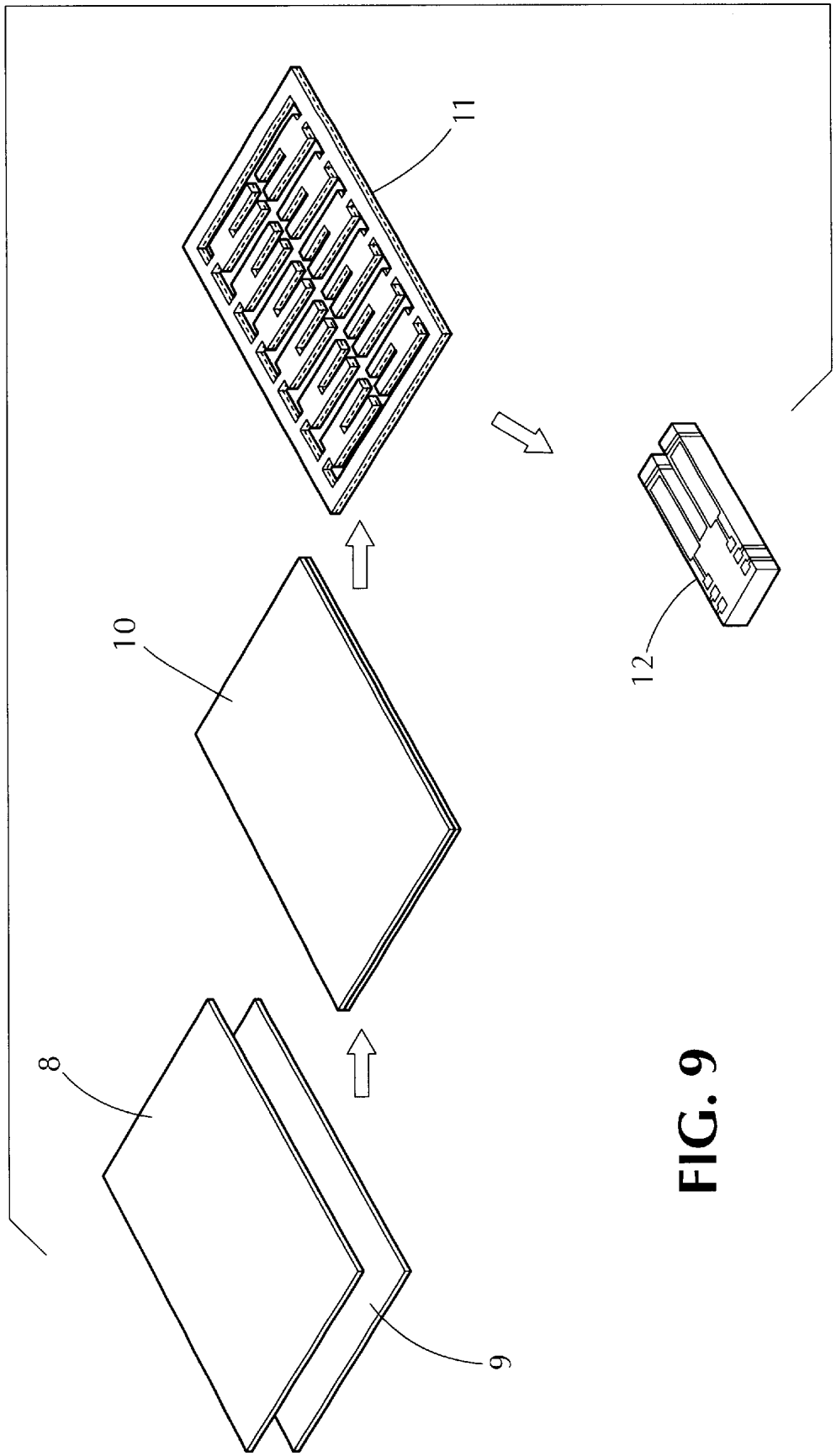
FIG. 9 is a process diagram for manufacturing a tuning fork oscillator of the invention.

FIG. 9 illustrates a process for manufacturing an angular velocity sensor in accordance with the first embodiment of the present invention. In FIG. 9, reference numerals 8 and 9 designate wafers made of a single crystalline material, such as quartz. Each of the wafers 8 and 9 is dimensioned to have a thickness which is approximately one half of the thickness of the final or resulting tuning fork oscillator 12. Additionally, the wafers 8 and 9 are selected to have crystal axes of different azimuths. In this example, the azimuths of the wafers 8 and 9 are in a reversed relation with respect to each other in their principal planes.

Wafers 8 and 9 are directly bonded by the bonding method into a single sheet 10. By a conventional photolithographic process, similar to those used to manufacture the prior art tuning fork oscillator or the like, the tuning fork oscillators are formed, as designated generally by 11. Thereafter, electrodes are formed on the tuning fork oscillator using conventional techniques the tuning fork oscillators are then divided into the individual tuning fork oscillators 12. By bonding the single crystalline piezoelectric materials with different crystal axes directions in the wafer state, the tuning fork oscillators can then be manufactured employing a process similar to that of the ordinary tuning fork oscillator or the like.

Figure 10:
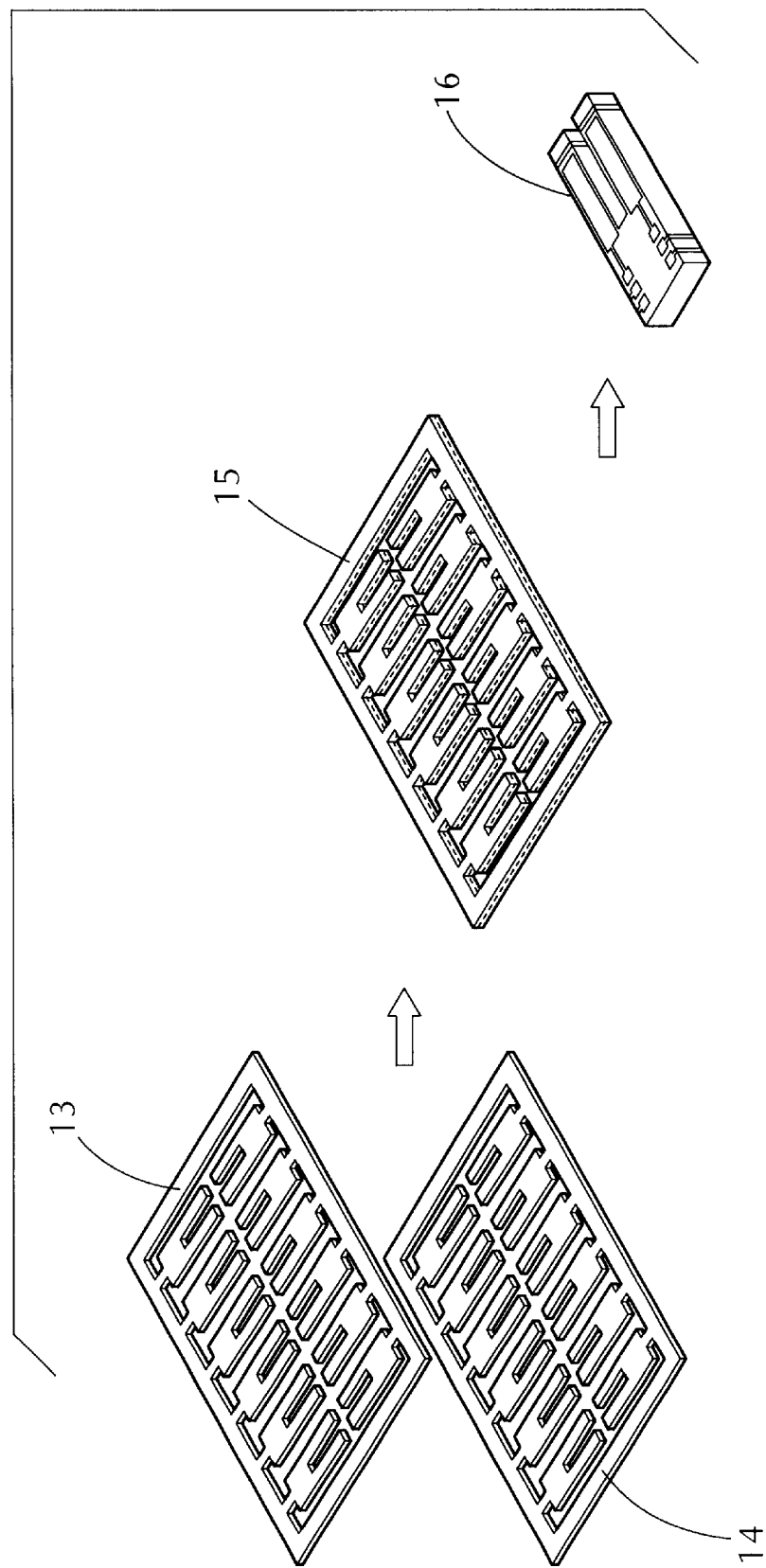
FIG. 10 is a process diagram of an alternate process for manufacturing a tuning fork oscillator of the invention.

FIG. 10 illustrates an alternate process for manufacturing the angular velocity sensor of embodiment 1. In FIG. 10, wafers 13 and 14 are thin sheets of the single crystalline piezoelectric material, such as quartz, in which the tuning fork oscillators are formed by a photolithographic process. The wafers 13 and 14 are about one half the thickness of a resulting or final tuning fork oscillator 16. As before, the tuning fork oscillators have crystal axes of different azimuths. Wafers 13 and 14 are precisely positioned by means of an aligner and then directly bonded into a bimorph structure as generally indicated by reference numeral 15. Next, electrodes are formed on the tuning fork oscillators and thereafter they are divided into the individual tuning fork oscillators 16. By using this technique which forms the tuning fork by etching the material with about one half of the dimension of the final tuning fork oscillators, the etching time period is approximately halved with respect to the time period ordinarily required. In addition, the flatness of the etched section can be easily retained and thick oscillators can be formed with ease and precision.

Figure 11:
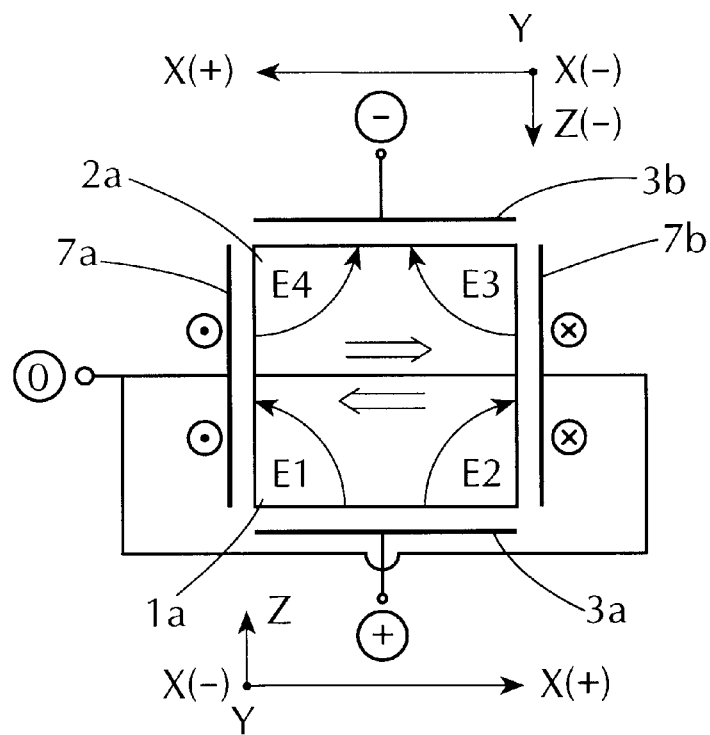
FIG. 11 is a diagram showing an alternate arrangement of the drive electrodes for the tuning fork oscillator shown in FIG. 1.
Figure 12:
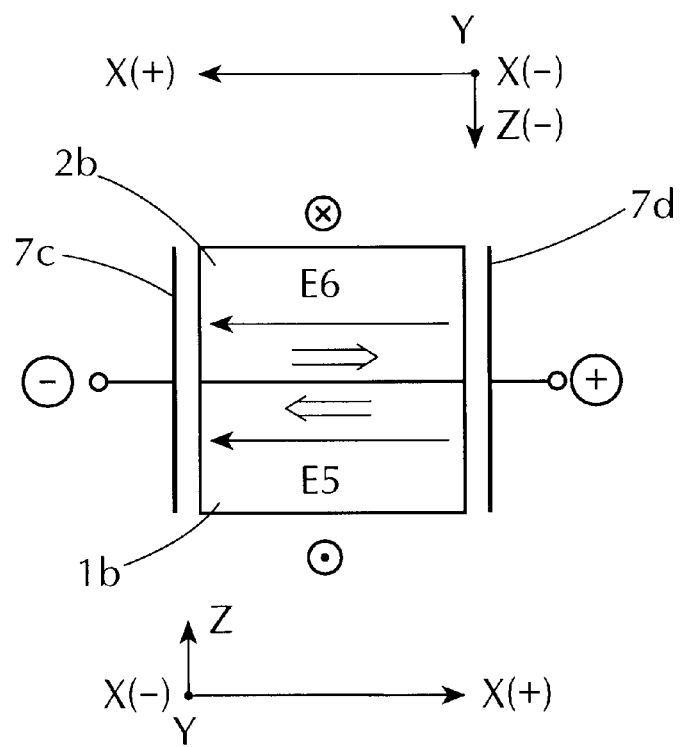
FIG. 12 is a diagram showing an alternate arrangement of sense electrodes for the tuning fork oscillator shown in FIG. 1.

In the first embodiment of the inventions, arms 1a and 2a of the tuning fork oscillators have sense electrodes 7a and 7b which also function as drive electrodes. However, as shown in FIGS. 11 and 12, electrodes 7a and 7b can be used only as the drive electrodes and the Coriolis force can be sensed by sense electrodes 7c and 7d. In addition, monitor electrode 5 and ground electrode 6 may be omitted.

Figure 13:
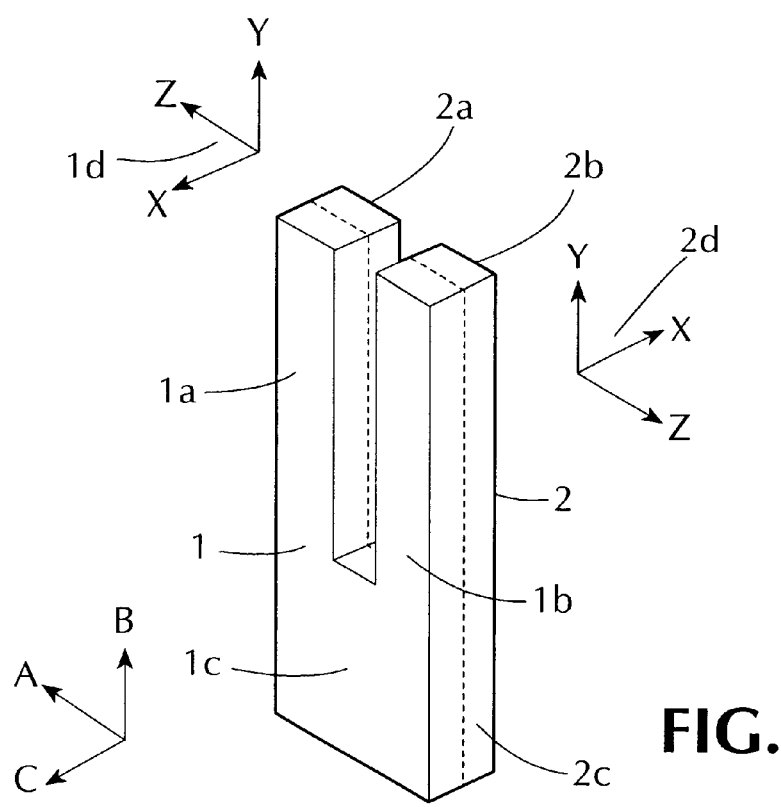
FIG. 13 is a diagram of a tuning fork oscillator of an angular velocity sensor according to a second embodiment of the invention.
Figure 14:
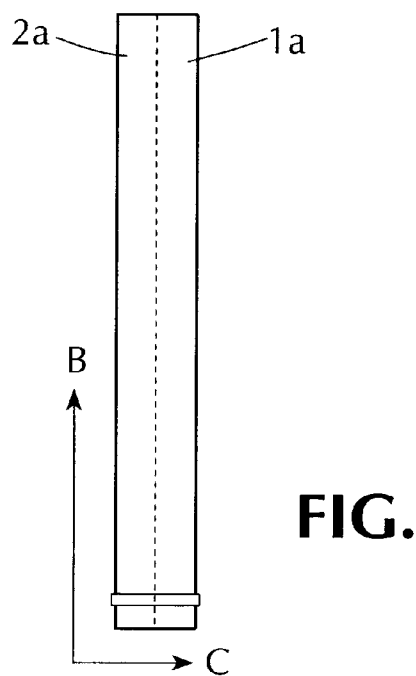
FIG. 14 a left side elevation view of the tuning fork oscillator of FIG. 13 showing the electrodes.
Figure 15:
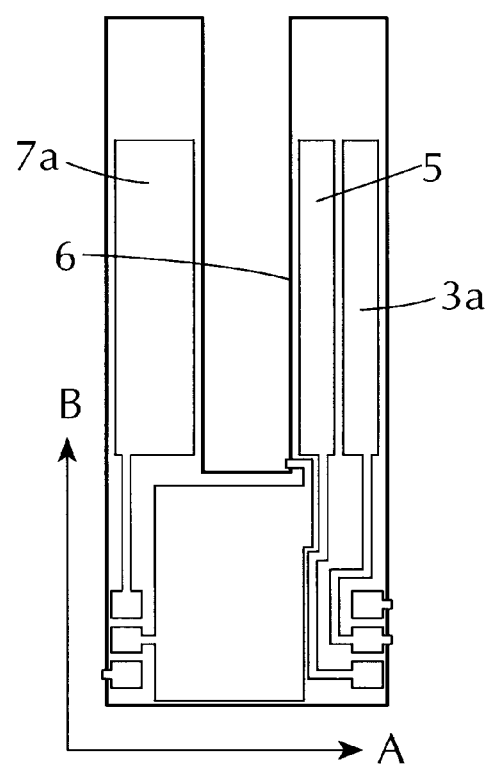
FIG. 15 is a front elevation view of the tuning fork oscillator of FIG. 13.
Figure 16:
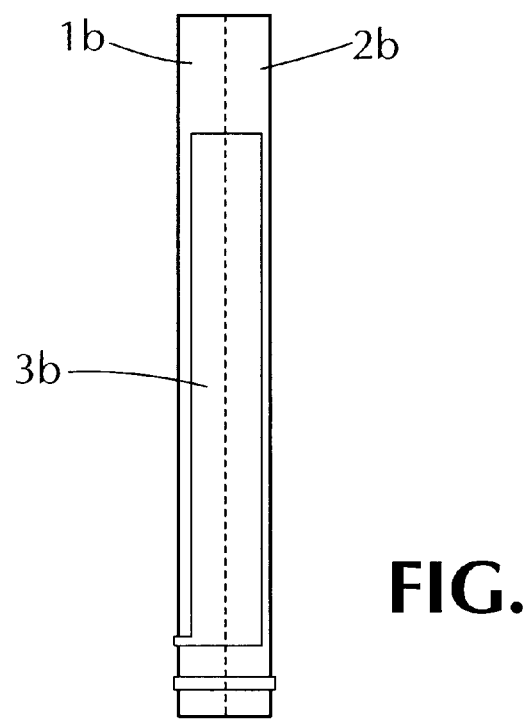
FIG. 16 is a right side elevation view of the tuning fork oscillator of FIG.
Figure 17:
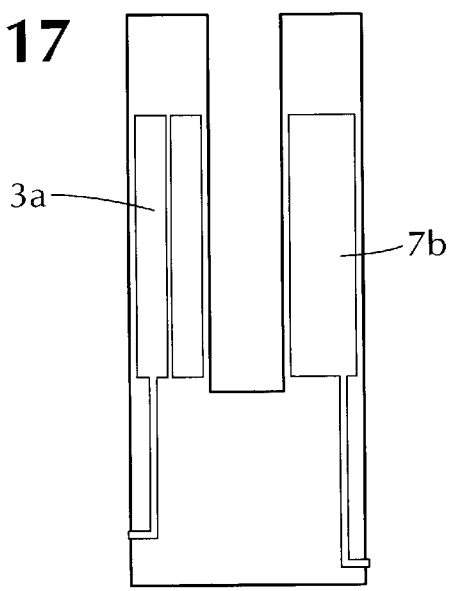
FIG. 17 is a rear elevation view of the tuning fork oscillator of FIG. 1.
Figure 18A:
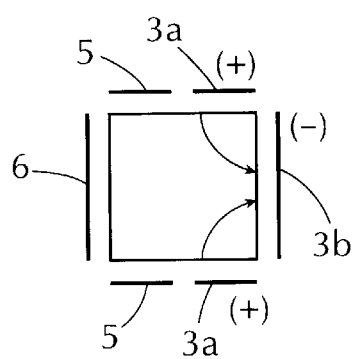
FIG. 18A is a schematic view showing the flow of electric charge during the drive mode of the tuning fork oscillator thereof.
Figure 18B:
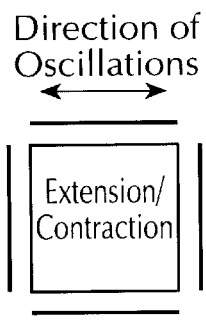
FIG. 18B is a schematic view showing the strain and direction of oscillation during the drive mode of the tuning fork oscillator thereof.
Figure 19A:
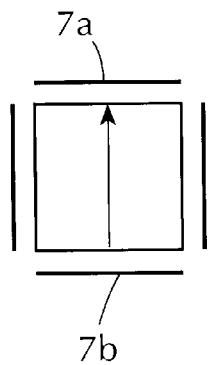
FIG. 19A is a schematic view showing the flow of electric charge during the detection mode of the tuning fork oscillator thereof.
Figure 19B:
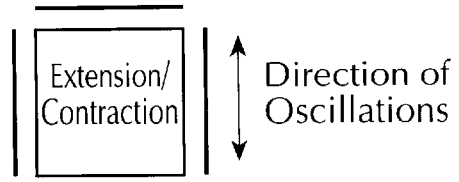
FIG. 19B is a schematic view showing the strain and direction of oscillation during the detection mode of the tuning fork oscillator thereof.

FIGS. 13 to 19 show an angular velocity sensor according to a second embodiment of the invention. In FIG. 13, reference numerals 1a and 1b designate a pair of arms which are joined by a root member 1c disposed therebetween to form a first tuning fork member 1. Likewise, the reference numerals 2a and 2b designate another pair of arms which are also joined are similarly joined at a root member 2c to form a second tuning fork member 2. Tuning fork members 1 and 2 are each made of a single crystalline piezoelectric material, such as quartz, and are directly bonded to each other to construct a bimorph structure. As shown in FIG. 13, tuning fork member 1 is bonded in the direction of crystal axes, as designated by 1d, and the tuning fork member 2 is bonded in the direction of crystal axes, as designated by 2d such that the X-axis of the respective arms is inverted. In other words, the first and second tuning fork members 1 and 2 are so bonded in the thickness direction C, that the X-axis directions are inverted from each other in their thickness direction C.

Figure 20:
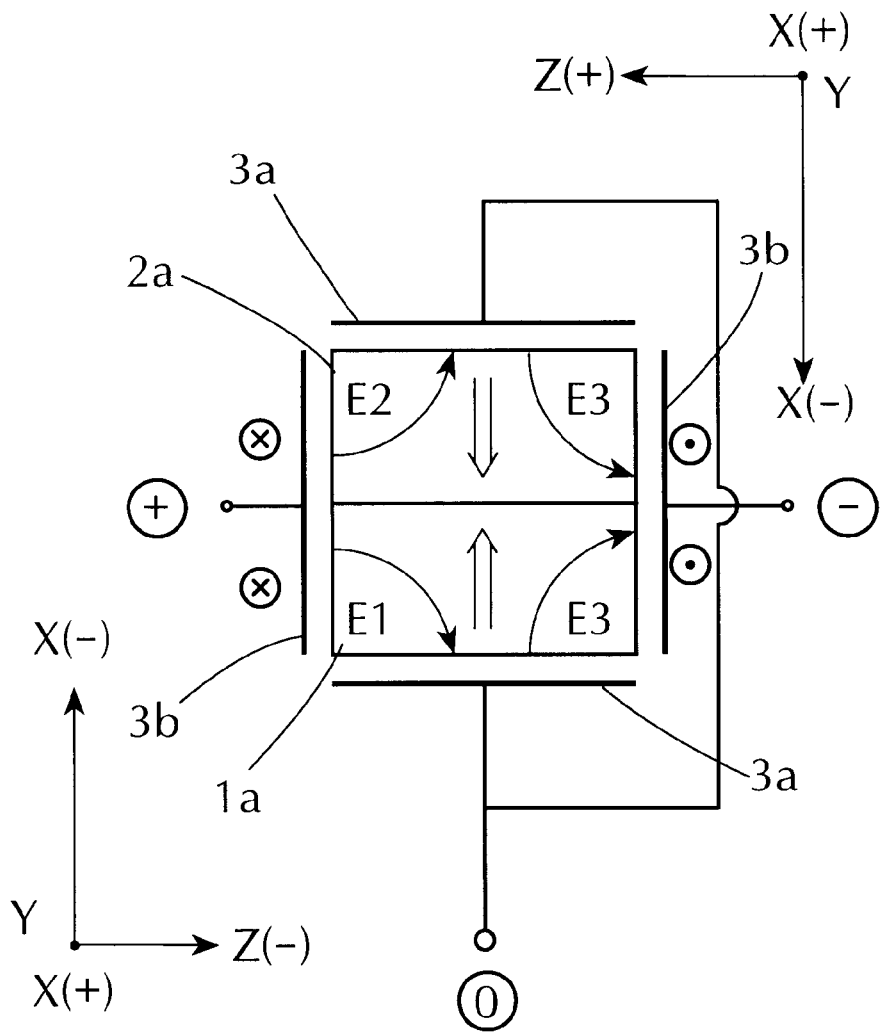
FIG. 20 is a diagram showing an alternate arrangement of the drive electrodes for the tuning fork oscillator shown in FIG. 13.

Referring to FIGS. 14–19, which show the second embodiment in greater detail, reference numerals 3a and 3bdesignate the drive electrodes, reference numeral 5 designates the monitor electrode, reference numeral 6 designates the ground electrode, all of which are mounted on one arm of the tuning fork and reference numerals 7a and 7b designate the sense electrodes which are mounted on the other arm of the tuning fork. As shown in FIG. 18A, in the drive mode, the charge flow is established by the two drive electrodes 3a, 3a mounted on the arms 1b and 2b, and the drive electrode 3b. Since the arms 1b and 2b are reversed in their X-directions, there is established a stress or strain which is reversed in the width direction of the arms thereby oscillating the arms in the A-B plane. The monitor electrode 5 detects the oscillation amplitude of the tuning fork oscillator. To detect the Coriolis force, as shown in FIGS. 19A and 19B, the X-axes are reversed on arms 1a and 2a so that the charge flow is homogeneous in the C-axis direction. As a result, the Coriolis force can be detected with sense electrodes 7a and 7b which are mounted in the A-B plane of the arms 1a and 2a. Alternatively, as shown in FIG. 20, the drive electrodes 3a and 3b may be formed on the four faces of arms 1b and 2b as single electrodes.

Figure 21:
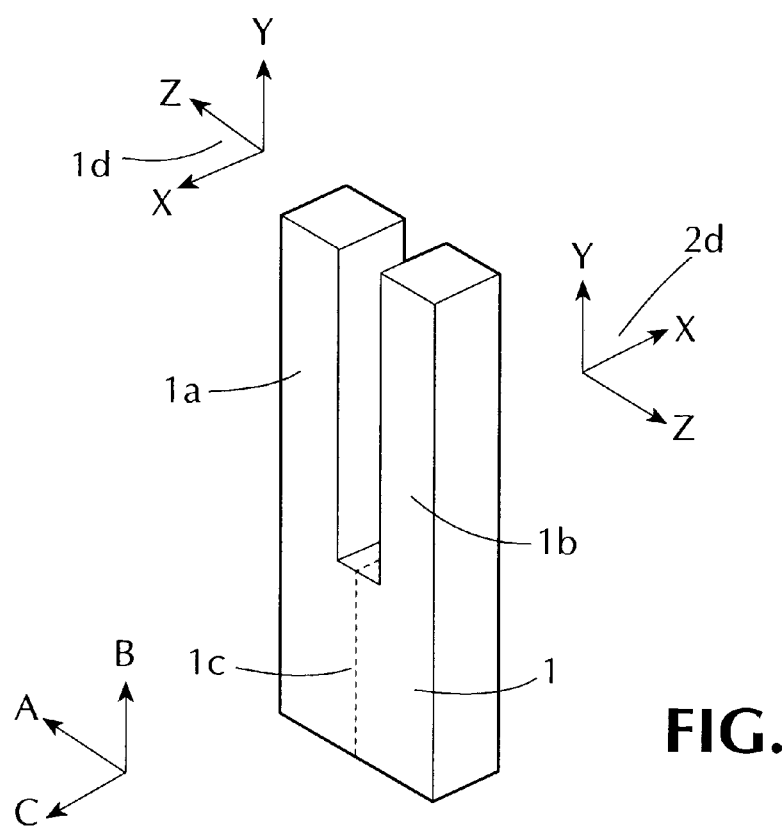
FIG. 21 is a diagram of a tuning fork oscillator of an angular velocity sensor according to a third embodiment of the invention.
Figure 22:
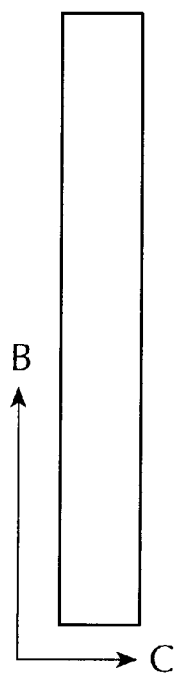
FIG. 22 a left side elevation view of the tuning fork oscillator of FIG. 21 showing the electrodes.
Figure 23:
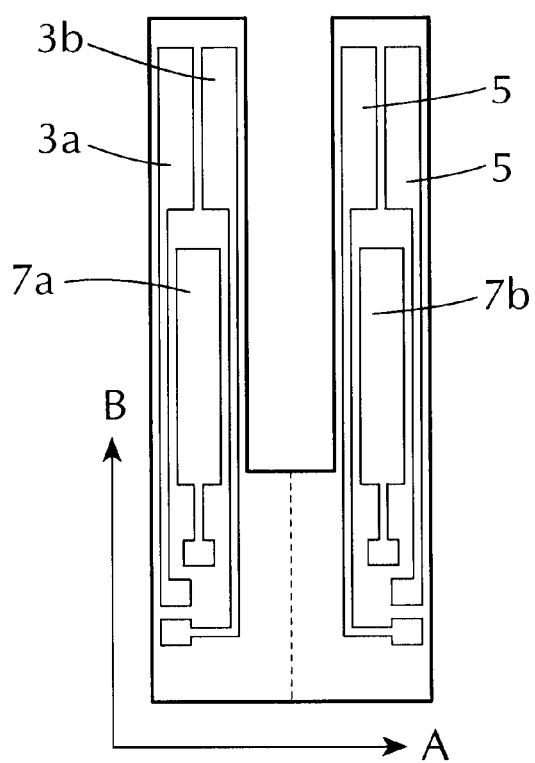
FIG. 23 is a front elevation view of the tuning fork oscillator of FIG. 22.
Figure 24:
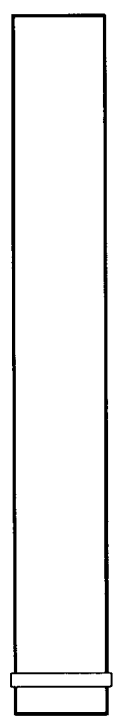
FIG. 24 is a right side elevation-view of the tuning fork oscillator of FIG. 22.

FIG. 21 shows an angular velocity sensor according to a third embodiment of the invention. In FIG. 21, reference numeral 1 designates the tuning fork oscillator which is made of a single crystalline piezoelectric material such as quartz and which is composed of a pair of arms 1a and 1b joined by the root member 1c. Arm 1a and arm 1b are joined at root member 1c such that the crystal axis azimuths of the X-axes are reversed in the thickness direction of the arms. As shown in FIG. 21, arms 1a and 1b have crystal axis directions, as designated by 1d and 2d, respectively, and arms 1a and 2b are directly bonded to each other in the width direction P1 with the crystal axis directions reversed in the thickness direction C. In the third embodiment, as shown in FIGS. 22 to 27B, drive electrodes 3a and 3b are mounted on arm 1a on a first principal face with and sense electrode 7a mounted on the same principal face of arm 1a and ground electrode 6 mounted in the opposite principal face of arm 1a. Monitor electrodes are mounted on the other arm 1b on a first principal face. Sense electrode 7b is mounted on the same principal face of arm 1b with ground electrode 6 mounted on the opposite principal face of arm 1b.

As shown in FIG. 26A and 26B, in the drive mode, a charge flow is established from the drive electrode 3a through the ground electrode 6 to the drive electrode 3b to generate a repeated stress in which the strain is reversed in the width direction of arm 1a. As a result, an extending/contracting force is generated in the arm 1a to cause the tuning fork oscillator to oscillate. In turn, monitor electrodes 5 detect the charge which is proportional to the oscillation amplitude of the tuning fork oscillator with respect to ground electrode 6. Next, in the Coriolis force detecting mode, charges are generated at the sense electrodes 7a and 7b by the charge flow, as shown in FIG. 27A and 27B. The sense electrodes 7a and 7b detect the Coriolis force and the acceleration component is cancelled by connecting them commonly, so that the external circuit does not require a differential amplifier.

Figure 28:
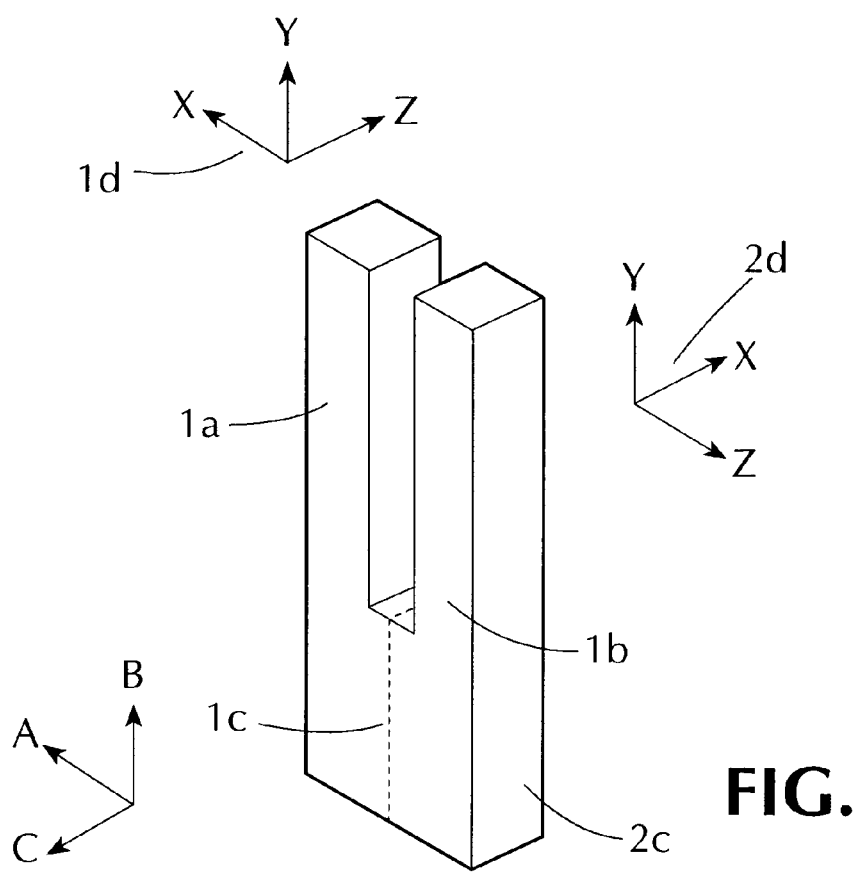
FIG. 28 is a diagram of a tuning fork oscillator of an angular velocity sensor according to a fourth embodiment of the invention.
Figure 31:
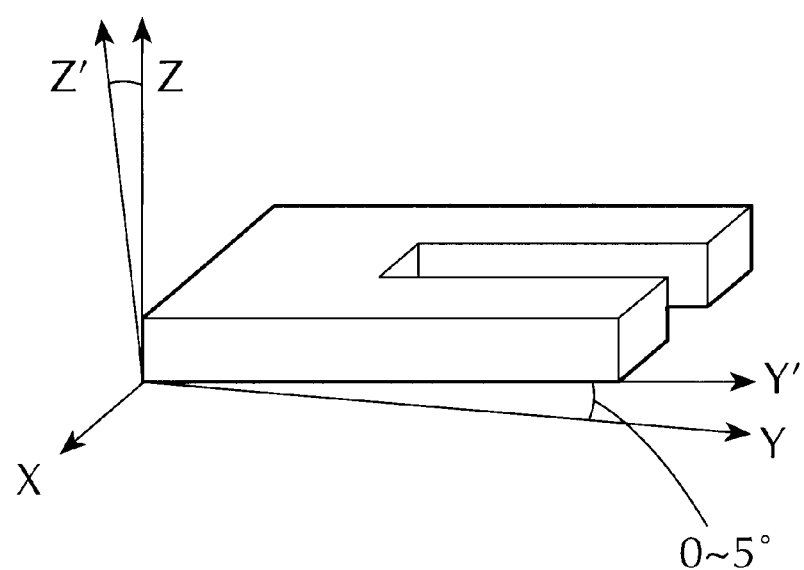
FIG. 31 is a diagram of the tuning fork oscillator of the prior art.

As shown in FIG. 28, the construction of the third embodiment may be modified such that the arms 1a and 1b are directly joined in the width direction A and have their crystal axis azimuths perpendicular in the A-C plane (see 1d and 2d). In this fourth embodiment, drive and monitor electrodes (not shown) are mounted to arm 1a to drive and monitor the tuning fork oscillator and sense electrodes (not shown) are mounted on arm 1b to detect the Coriolis force.

The angular velocity sensor using the tuning fork oscillator of the present invention could also be constructed as trifurcated type tuning fork oscillators, as shown in FIGS. 29A and 29D. Alternatively, a closed end type tuning fork oscillator may be constructed, as shown in FIGS. 29B and 29E. Finally, H-type tuning fork oscillators may also be constructed, as shown in FIGS. 29C and 29F. In addition, similar effects could be achieved even if the tuning fork oscillator were divided into three portions, as shown in FIG. 29G.

The foregoing individual embodiments have been described based on a quartz sheet in which the piezoelectric material is at a right angle in the Z-axis and X-axis directions. However, any quartz sheet could be employed even if it has a current angle to establish the tuning fork oscillations. The piezoelectric sheet having the tuning fork shape could be made of other single crystalline piezoelectric material, such as lithium tantalate ($LiTa_2O_3$) or lithium niobate ($LiNb_2O_5$).

Moreover, although the piezoelectric material has been described as a single crystalline material, the piezoelectric material could be a polycrystalline material, such as a ceramic. However, this polycrystalline material is prepared by agglomerating (aggregating) the grains of single crystals, for example, by sintering them, so that the grains have heterogeneous polarities. A so-called "polarizing treatment" is carried out by applying a high voltage to the polycrystalline material to array its grains in the proper polarities. Moreover, the polarization of this case is directed in the X-direction.

Now that the preferred embodiments of the present have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. An angular velocity sensor comprising:
    a tuning fork having:
        (a) a first tuning fork member having at least two arms made of single crystalline piezoelectric material and at least one root member joining said arms; and a second tuning fork member having a shape generally similar to that of the first tuning fork member, the second fork member made of single crystalline piezoelectric material,
        said first tuning fork member and second tuning fork member being directly bonded to each other in the thickness direction of the first tuning fork member and second tuning fork member, said bond forming an interface therebetween extending in the width direction thereof without a central electrode and without adhesive disposed between said first and second tuning fork members, such that the polarity of the electric axis of the piezoelectric material for each of the first and second tuning fork members is inverted from each other in the width direction thereof, said tuning fork thereby comprising at least a first tuning fork arm and a second tuning fork arm, each of said first and second tuning fork arms having two opposed side surfaces extending across said interface and two opposed main surfaces orthogonal to said side surfaces, and a tuning fork root between said tuning fork arms;
        (b) sense electrodes disposed across said interface on the two opposed side surfaces of each of said first and second tuning fork arms for detecting the electric charges generated as a result of the angular rotation of said sensor; and
        (c) drive electrodes disposed on two opposed main surfaces of said first tuning fork arm for causing the tuning fork to vibrate in the width direction thereof.

2. The angular velocity sensor as claimed in claim 1 wherein the first tuning fork member and the second tuning fork member are directly bonded according to a method comprising the steps of:
    smoothing the surfaces of the first tuning fork member and second tuning fork member;
    performing a hydrophilic treatment on the surfaces thereof;
    adsorbing hydroxide radicals onto the surfaces thereof; and
    superposing and thermally treating the first tuning fork member and second tuning fork member.

3. An angular velocity sensor comprising:
    a first tuning fork member including at least two arms made of single crystalline piezoelectric material and at least one root member joining said arms; and
    a second tuning fork member having a shape generally similar to that of said first tuning fork member and made of single crystalline piezoelectric material directly bonded to the first tuning fork member in the thickness direction thereof, said bond forming an interface between said tuning fork members extending in the width direction thereof without the use of adhesive and without a central electrode disposed in said interface, with the polarity of the electric axes of the piezoelectric material of said first and second tuning fork members inverted from each other in the width direction;
    wherein said bonded tuning fork members form a tuning fork with two tuning fork arms, each arm having four peripheral faces, two of said peripheral faces on opposed side surfaces of each of said tuning fork arms extending in the thickness direction across said interface; and
    sense electrodes disposed on at least one of said opposed side surfaces extending across said interface for detecting electric charges generated as a result of the angular rotation of said sensor.

4. The angular velocity sensor as set forth in claim 3 further comprising at least one drive electrode disposed on one of said peripheral faces on at least one of said tuning fork arms extending in the width direction orthogonal to said side surfaces for causing the tuning fork arms of said sensor to vibrate in the width direction.

5. An angular velocity sensor comprising:
a tuning fork for the angular velocity sensor including:
- a first tuning fork member having at least two arms made of single crystalline piezoelectric material and at least one root member joining said arms;
- a second tuning fork member having a shape generally similar to that of the first tuning fork member, the second fork member made of single crystalline piezoelectric material, wherein said first tuning fork member and second tuning fork member are directly bonded to each other in the thickness direction and in the crystalline axis direction of the first tuning fork member and second tuning fork member, said bond forming an interface between said tuning fork members, and wherein said crystalline axis direction is defined so that the polarities of piezoelectric phenomenon of said first and second tuning fork members are opposite to each other in the width direction;
- a drive electrode disposed on a first surface of a first arm of said tuning fork where said first and second tuning fork members are opposite to each other;
- a first sense electrode disposed across said interface on a side surface of a first arm of said tuning fork where said first and second tuning fork members are opposite to each other; and
- a second sense electrode disposed across said interface on a side surface of a second arm of said tuning fork where said first and second tuning fork members are opposite to each other;
- wherein said first sense electrode and second sense electrode are formed so that each of said first sense electrode and seconds sense electrode extends over a boundary of bonding of said first and second tuning fork members;
- wherein said drive electrode causes vibration of said tuning fork in the direction which is parallel to said first surface of said tuning fork; and
- wherein said first and second sense electrodes detect electric charges generated by vibration of said tuning fork in the direction perpendicular to said first surface of said tuning fork.

6. The angular velocity sensor as claimed in claim 5, wherein the first tuning fork member and the second tuning fork member are directly bonded according to a method including the steps of:
- smoothing the surfaces of the first tuning fork member and second tuning fork member;
- performing a hydrophilic treatment on the surfaces thereof;
- adsorbing hydroxide radicals onto the surfaces thereof; and
- superposing and thermally treating the first tuning fork member and second tuning fork member.

* * * * *

UNITED STATES PATENT AND TRADEMARK OFFICE
CERTIFICATE OF CORRECTION

PATENT NO.   : 6,532,817 B1
DATED        : March 18, 2003
INVENTOR(S)  : Junichi Yukawa et al.

It is certified that error appears in the above-identified patent and that said Letters Patent is hereby corrected as shown below:

<u>Title page,</u>
Item [73], Assignee, after "(JP)", add -- and Nihon Denpa Kogyo Co., Ltd., Tokyo (JP) --

Signed and Sealed this

First Day of June, 2004

JON W. DUDAS
*Acting Director of the United States Patent and Trademark Office*